United States Patent [19]

Cuelenaere et al.

[11] E Re. 30,596

[45] Reissued Apr. 28, 1981

[54] IMAGE INTENSIFIER TUBE DEVICE

[75] Inventors: Augustinus J. Cuelenaere, Leiden; Lambertus K. Van Geest, Roden, both of Netherlands

[73] Assignee: N. V. Optische Industrie "De Oude Delft", Netherlands

[21] Appl. No.: 833,460

[22] Filed: Sep. 15, 1977

Related U.S. Patent Documents

Reissue of:

[64] Patent No.: Re. 29,233
Issued: May 24, 1977
Appl. No.: 685,657
Filed: May 12, 1976

Which Is a Reissue of:

[64] Patent No.: 3,916,240
Issued: Oct. 28, 1975
Appl. No.: 519,298
Filed: Oct. 30, 1974

[30] Foreign Application Priority Data

Nov. 16, 1973 [NL] Netherlands ..... 7315716

[51] Int. Cl.[2] ..... H01J 39/00
[52] U.S. Cl. ..... 313/102; 250/213 VT
[58] Field of Search ..... 250/213 VT; 313/94, 313/99, 102; 315/10

[56] References Cited

U.S. PATENT DOCUMENTS

| | | | |
|---|---|---|---|
| 3,280,356 | 10/1966 | Stoudenheimer et al. | 313/94 X |
| 3,706,903 | 12/1972 | Hansen | 315/10 |
| 3,708,673 | 1/1973 | Blacker, Jr. | 250/213 VT |

*Primary Examiner*—Lawrence J. Dahl
*Attorney, Agent, or Firm*—Louis E. Marn; Elliot M. Olstein

[57] ABSTRACT

An image intensifier tube device including a plurality of diode image intensifier tubes. Each tube comprises a sealed cylindrical envelope having its one end closed by an entry window carrying a photo-sensitive, electron emitting layer enclosed by a good electrically conductive rim. A resistive layer is deposited by vaporization between the circumference of the electron emitting layer and the good electrically conductive rim, which resistive layer is connected to a terminal of a voltage source having its other terminal connected to an anode and to focussing means of the tube such that in response to a sudden increase in the brightness of the image to be intensified a voltage drop is produced across the resistive layer, as a result of which the emitted electrons are de-focussed and/or deflected.

11 Claims, 2 Drawing Figures

IMAGE INTENSIFIER TUBE DEVICE

Matter enclosed in heavy brackets [ ] appears in the original patent but forms no part of this reissue specification; matter printed in italics indicates the additions made by reissue.

The present invention relates to an image intensifier tube device including one or more image intensifier tubes, comprising a sealed cylindrical envelope having its one end closed by an entry window on the inner surface of which a photo-sensitive, electron emitting layer is deposited which is in good electrical contact with, and enclosed by, a substantially circular, good electrically conductive rim, and having its other end closed by an exit window on which an anode in the form of a phosphor screen is deposited, means being provided for focussing a beam of electrons released from the photosensitive, electron emitting layer by incident radiation, the means comprising at least a cathode flange mounted around the substantially circular, good electrically conductive rim, the cathode flange being sealed by fritting to the entry window and being electrically connected to an electrically conductive, cylindrical member which constitutes part of the envelope, the device further comprising a source of voltage located outside the envelope, the voltage source having its positive terminal connected to the anode and supplying such voltages to the anode, the focussing means and the photo-sensitive, electron-emitting layer, that an electric field is formed within the envelope which focusses the beam of electrons released from the photosensitive, electron emitting layer onto the anode.

Such image intensifier tube devices are well known and are employed for making observations at low light levels, e.g. at night, or in order to create a visible image from radiation invisible to the human eye. To this end an image of the scene to be observed is formed by means of a lens system on the photo-sensitive, electron emitting layer. There is however, a danger that a very sudden and large increase in the lighter or radiation level, for example due to a shell exploding in the field of view, causes an increase in the intensity per unit area of the beam of electrons incident on the anode such that local burnout of the anode occurs. For example, in an apparatus comprising an image intensifier tube operated with a voltage difference between the anode and the photo-sensitive electron emitting layer of 12 kV, and having, under normal circumstances, an emission current of 0.01 $\mu$A, burnout symptoms will occur when, as a consequence of a sudden flash of light, the emission current attains a value of 1 $\mu$A.

It is an object of the present invention to provide an image intensifier tube device of the above described type, but incorporating means for preventing anode burnout due to very sudden increase in the intensity of incident radiation.

To this end, an image intensifier tube device according to the present invention is characterized in that at least one diode image intensifier tube comprises a layer deposited by vaporization between the good electrically conducting, substantially circular rim and the assembly of the cylindrical member and the cathode flange, the layer having a high resistance and low capacitance so that, upon a sudden increase in the intensity of the radiation incident on the photo-sensitive, electron emitting layer up to a level where there is a danger of anode burnout by the released beam of electrons, the increased emission current caused thereby sets up a voltage difference between the good electrically conducting, substantially circular rim and one of the focussing means, such that the electrons are defocussed and/or deflected.

The present invention will now be described with reference to the accompanying drawings, in which.

Figure 1:
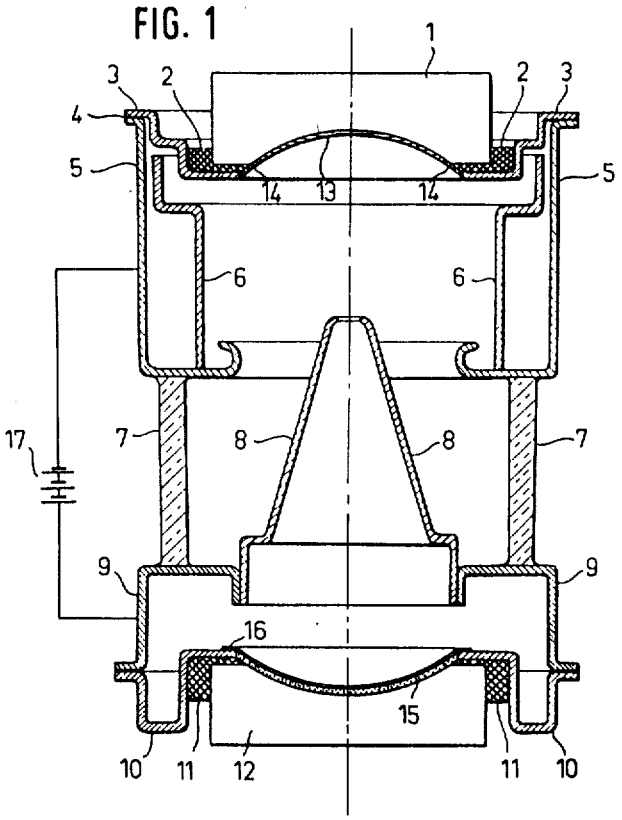
FIG. 1 shows a schematic sectional view of a known image intensifier tube device in which the image intensifier tube is a diode.

The image intensifier tube device illustrated schematically in FIG. 1 has a fibre optic faceplate 1 constituting the entry window. Faceplate 1 is sealed by means of a fritted layer 2 to an electrically conductive cathode flange 3 which in turn is electrically connected at 4 to an electrically conductive cylindrical member 5 having an electrically conductive inner wall 6. Cylindrical member 5 is sealed in a known manner to a cylindrical glass casing member 7. Casing member 7 is sealed to an anode structure comprising an electrically conductive, conical member 8 electrically connected to an electrically conductive flange member 9 which in turn is electrically connected to a second electrically conductive flange member 10. Flange member 10 is sealed by means of a fritted layer 11 to a fibre optic faceplate 12 constituting the exit window.

A photo-sensitive, electron emitting layer 13 is applied to the inner surface of faceplate 1 by, for example, vaporization. A good electrically conductive rim 14 is provided around the photo-sensitive layer, such that, as can be seen in FIG. 1, it connects photosensitive layer 13 with cathode flange 3.

The inner surface of faceplate 12 is coated with a phosphor layer 14, on which layer 14, a thin layer 16 is deposited by, for example, vaporization of aluminum. This layer 16 is permeable to electrons and extends over at least part of flange member 10.

A voltage source 17 has its negative terminal connected to the assembly comprising cylindrical member 5, inner wall 6 and cathode flange 3 (in FIG. 1 to cylindrical member 5), and has its positive terminal connected to the assembly comprising flange members 9 and 10 and conical member 8 (in FIG. 1 to flange member 9).

The image intensifier tube device described above with reference to FIG. 1 is employed in making observations at very low light levels. The device can, however, also be used for forming a visible image from radiation invisible to the human eye.

When making observations, an image of a scene is formed on the photo-sensitive, electron emitting layer 13 by means of an optical system (not shown). The beam of electrons released as a result of the radiation incident on the photo-sensitive layer 13 is accelerated by the electric field formed within the sealed envelope (constituted by faceplate 1, cathode flange 3, cylindrical member 5, cylindrical casing member 7, flange members 9 and 10 and finally faceplate 12) by the voltages obtained from voltage source 17 in the direction of the phosphor layer 15 carrying the aluminum layer 16. According to techniques well known in the field of image intensifiers, the various electrically conducting components to which the voltages are applied, and the applied voltages themselves, are shaped or chosen such that the beam of electrons is focussed on phosphor layer 15. An image appears in the usual manner on phosphor layer 15, which image can be observed through faceplate 15 and has a greater brightness than the original image of the scene formed on photosensitive layer 13.

When an image intensifier tube device such as described above is used for observing an outdoor scene, as is usual in, for example, military practice, and a shell is exploded in the field of view, this may lead to such an increase in the local intensity of the radiation incident on photo-sensitive layer 13 that the local intensity of the beam of electrons incident on phosphor layer 15 becomes so high that phosphor layer 15 and/or aluminum layer 16 burnout at the point of incidence.

Experience has shown that these burnout phenomena accompany emission currents approximately 100 times larger than emission currents occurring under normal operating conditions.

The object of the present invention is to provide an image intensifier tube device of the above type in which a beam of electrons incident on the phosphor layer is defocussed and/or deflected in response to an increased emission current.

Figure 2:
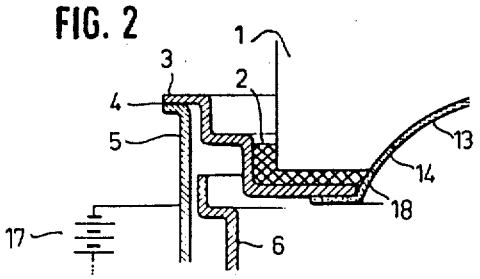
FIG. 2 shows a detail of the image intensifier tube device shown in FIG. 1 on a larger scale to illustrate an embodiment of the invention.

A detail of an embodiment of the image intensifier tube device according to the invention is illustrated in FIG. 2 on a larger scale. It is observed that the components of the image intensifier tube device shown in FIG. 1 which are not shown in FIG. 2 may have the same form in the embodiment shown in FIG. 2. Thus, part of faceplate 1, fritted layer 2, cathode flange 3, cylindrical member 5 and inner wall 6 is shown in FIG. 2. In addition FIG. 2 shows a part of photo-sensitive, electron emitting layer 13 and electrically conductive rim 14. As can be seen in FIG. 2, electrically conductive rim 14 does not extend beyond fritted layer 2 in this embodiment of the invention. On the contrary, in this embodiment an electrically resistive layer 18 is applied by vaporization to be contiguous with electrically conductive rim 14, which layer 18 extends past fritted layer 2 and covers part of cathode flange 3. This electrically resistive layer 18 may extend along the whole circumference of electrically conductive rim 14 or only along a part of this circumference. The resistance of this resistive layer 18 is chosen so that under normal operating conditions the voltage drop across the resistive layer has a value such that the beam of electrons remains focussed on the phosphor layer. For example, if under normal operating conditions the emission current has a value of 0.05 $\mu$A, the resistance of resistive layer 18 will be chosen such that the voltage drop across this layer does not exceed a few volts, for example, maximally 5 volts. The resistance may be, for example, 1 M$\Omega$ or more. If a sudden increase in the emission current occurs as a result of a sudden increase in the local intensity of incident radiation, the voltage drop across resistive layer 18 will increase from a value of below 5 volts to a value which, if the emission current increases by a factor of 100, may be some tens or even hundreds of volts. This will cause the voltage difference between, on the one hand, the assembly comprising cathode flange 3, cylindrical member 5 and inner wall 6 and, on the other hand, electrically conductive rim 14 to be changed, this in turn causing the electric field within the envelope to change so that the beam of electrons is no longer focussed on phosphor layer 15. The consequence of this is that the local intensity of the electrons incident on the phosphor layer is decreased and burnout is thereby prevented.

Clearly the advantage of this embodiment is that the increased voltage drop across resistive layer 18, which alters the voltage difference between, on the one hand, the assembly comprising good electrically conductive rim 14 and photo-sensitive layer 13 and, on the other hand, the assembly comprising cathode flange 3, cylindrical element 5 and inner wall 6, causes a change in the electric field near photo-sensitive layer 13, i.e. at the place where the electrons having just emanated from the photo-sensitive layer still have a very low velocity and so can be easily influenced. An additional point is that the capacitance of the resistive layer should be kept as low as possible in order to prevent this capacitance from short-circuiting the resistive layer when a rapidly increasing intensity of the incident radiation causes the emission current to increase. The value of the capacitance is preferably below 5 pF.

It is observed that a combination of an internal resistive layer 18 and an external resistive means is also possible.

In another embodiment of the image intensifier tube device according to the present invention the resistive layer may have a non-linear characteristic so that for currents of, for example, up to approximately ten times the normally occurring value, the resistance is such that the voltage drop produced across the layer does not exceed a few volts, whereas for currents greater than approximately ten times the normally occurring value, the resistance has a value at least ten times its value under normal operating conditions.

It will be clear that this last described embodiment can be combined with the previously described embodiment.

In the above embodiments it is also possible that the assembly connected to the negative terminal of the voltage source, such as the assembly constituted by cylindrical element 5 and cathode flange 3 in FIG. 2, is divided into two sections, e.g. parallel to the plane of the drawing. When these two sections are insulated from each other and both sections are connected to the negative terminal of the voltage source, while resistive layer 18 is connected to only one of the sections, a sudden increase of the emission current will not only result in a de-focussing of the beam of electrons, but also in a movement of the beam across the phosphor layer as this beam is laterally deflected. This last effect will, of course, contribute to keeping the phosphor layer from burning out.

We claim:

1. An image intensifier tube device including one or more diode image intensifier tubes, comprising a sealed cylindrical envelope having its one end closed by an entry window on the inner surface of which a photosensitive, electron emitting layer is deposited which is in good electrical contact with, and enclosed by, a substantially circular, good electrically conductive rim, and having its other end closed by an exit window on which an anode in the form of a phosphor screen is deposited, means being provided for focussing a beam of electrons released from the photo-sensitive, electron emitting layer by incident radiation, said means comprising at least a cathode flange mounted around the substantially circular, good electrically conductive rim, the cathode flange being sealed [by fritting] to the entry window and being electrically connected to an electrically conductive, cylindrical member which constitutes part of the envelope, the device further comprising a source of voltage located outside the envelope, said voltage source having its positive terminal connected to the anode and supplying such voltages to the anode, the focussing means and the photosensitive, electron emitting layer, that an electric field is formed within the envelope which focusses the beam of electrons released from the photo-sensitive electron emitting layer onto the anode, characterized in that at least one diode image intensifier tube comprises a layer [deposited by vaporization] between the good electrically conducting, substantially circular rim and the assembly of the cylindrical member and the cathode flange, said layer having a high resistance and low capacitance so that, upon a sudden increase in the intensity of the radiation incident on the photo-sensitive, electron emitting layer takes place up to a level where there is a danger of anode burnout by the released beam of electrons, the increased emission current caused thereby sets up a voltage difference between the good electrically conducting, substantially circular rim and one of the focussing means, such that the electrons are de-focussed and/or deflected.

2. [An] *The* image intensifier tube device according to claim 1, characterized in that said layer *is* deposited by vaporization *and* has a linear characteristic and a resistance greater than 1 MΩ and a capacitance less than 5 pF.

3. [An] *The* image intensifier tube device according to claim 1, characterized in that said layer *is* deposited by vaporization *and* has a non-linear characteristic such that for an emission current below approximately 100 [[m]] nA the resistance is below 1 MΩ and for an emission current above 100 [[m]] nA the resistance is above approximately 10 MΩ.

*4. In an image intensifier tube having an envelope containing an electron emitting cathode surface, focus means for establishing an electric field configured to accelerate and focus electrons emitted from said cathode and a phosphor anode surface for receiving the accelerated electrons, the improvement comprising in combination flash protection means for limiting burnout of the phosphor surface from sudden increases in current intensities, said flash protection means including resistance means exhibiting low capacitance disposed inside said envelope connected to produce a voltage change at said focus means in response to electron flow between said surfaces effective to reduce the impact of accelerated electrons reaching said phosphor surface below burnout level.*

*5. The improved image intensifier tube according to claim 4 wherein said image intensifier tube takes the form of a diode having anode and cathode electrode structure.*

*6. The improved image intensifier tube according to claim 4 wherein said resistance element is interposed between said cathode surface and said focus means to influence electrons at low velocity emitted by said cathode surface.*

*7. The improved image intensifier tube according to claim 4 wherein the focus means includes a cylindrical member forming part of the envelope between said emitting cathode surface and phosphor anode surface, and said resistance element being connected between said cathode surface and said cylindrical member.*

*8. The improved image intensifier tube according to claim 7 wherein said emitting cathode surface has an electrically conductive annular ring thereabout, and said resistance element being a thin annular film connecting said electrically conductive annular ring to said focus means.*

*9. The improved image intensifier tube according to claim 4 wherein said resistive element exhibits a non-linear characteristic manifesting increased resistance as a function of increased current flow.*

*10. The improved image intensifier tube according to claim 4 wherein said focus means includes two adjacent conductive cathode sections and said resistance element is connected to at least one of said sections.*

*11. The improved image intensifier tube according to claim 4 wherein the resistive element has a resistance greater than 1 MΩ and a capacitance less than 5pF.*

* * * * *